April 25, 1933.  C. G. NAYLOR  1,906,010
PIPE AND METHOD OF MAKING THE SAME
Filed April 5, 1930
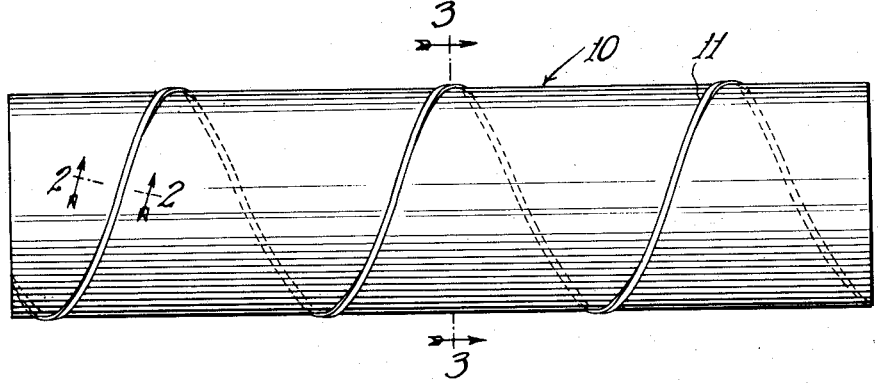
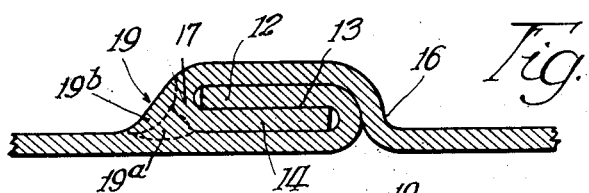
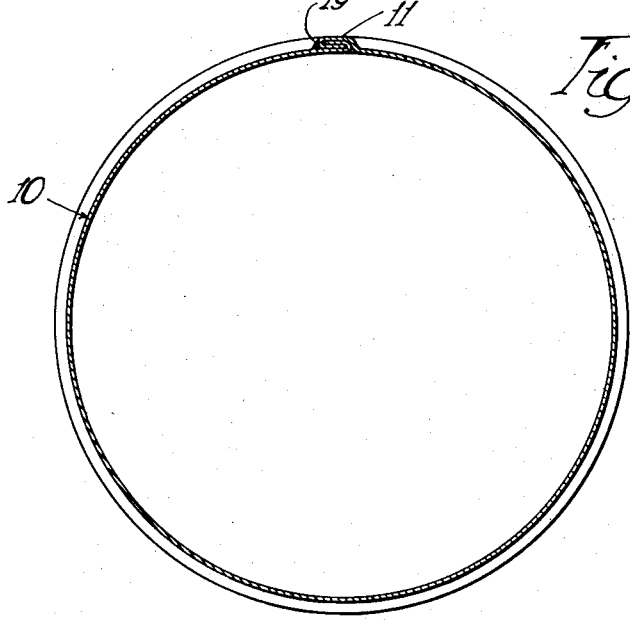
Inventor
Carl G. Naylor Patented Apr. 25, 1933

1,906,010

UNITED STATES PATENT OFFICE

CARL G. NAYLOR, OF CHICAGO, ILLINOIS, ASSIGNOR TO NAYLOR PIPE COMPANY, OF CHICAGO, ILLINOIS, A CORPORATION OF ILLINOIS

PIPE AND METHOD OF MAKING THE SAME

Application filed April 5, 1930. Serial No. 441,884.

This invention relates to pipe, and has as its primary object the production of spiral pipe which is of improved construction.

One form of the invention is embodied in pipe formed by winding a ribbon or strip of metal into spirally related convolutions secured to each other by a spiral interlocking seam which is formed in such manner that it comprises a folded edge that lies adjacent the outer surface of the pipe, the folded edge being welded to the outer surface of the pipe. In practice, the folded edge is preferably welded to the outer surface by employing a welding machine of the metallic electrode type, and the finished weld is preferably the result of a plurality of welding operations, one of the welding operations being performed over another. This prevents corrosion and insures that the seam will be fluid-tight. Another important advantage is that the second welding operation anneals the metal which has been left brittle by the first welding operation. In forming the lock seam an outwardly flaring flange is formed in the lock seam. Obviously, this flaring flange will yield more than the longitudinally extending portions of the wall when the pipe is subjected to forces tending to change the length of the pipe or to bend it.

The pipe is a commercial product for various purposes before the welding operations as the interlocking seam secures the convolutions rigidly to each other. The weld is a seal.

Many other objects and advantages will appear as this description progresses, reference being had to the accompanying drawing, wherein:

Figure 1 is a side elevation of a pipe which embodies the invention;

Fig. 2 is an enlarged section taken on line 2—2 of Fig. 1, and

Fig. 3 is an enlarged section taken on line 3—3 of Fig. 1.

In the drawing, I have shown a spiral pipe which is designated generally by the reference character 10 and is formed preferably by winding a strip or ribbon of metal around a mandrel, not shown, or any other suitable means, to provide spirally related convolutions which are preferably secured to each other by an interlocking seam 11, the construction of the interlocking seam 11 being best shown in Fig. 2. It will be noted that one side edge of the ribbon or strip from which the pipe is formed is bent outward and backward to provide a flange 12 which is spaced from the outer surface of the pipe to provide a groove 13 into which a flange 14 projects. The flange 14 is formed upon the other side edge of the ribbon or strip.

The flange 14 is bent inward and back along the inner surface of the pipe or strip and is inserted in the groove 13. The inner surface of the strip contacts the outer surface of the flange 12, the strip or ribbon of metal from which the pipe is formed being offset, as at 16, so that the inside diameter of the pipe will be substantially constant the entire length thereof. The offset portion 16 is preferably in the form of an outwardly flaring flange extending along one edge of the lock beam 11.

The flange 14 is joined to the strip or ribbon by a folded edge 17 which lies adjacent the outer surface of the pipe. After the ribbon or strip has been wound in the manner described above and the spiral seam 11 has been formed therein, the folded edge 17 is welded to the outer surface of the pipe, as indicated generally at 19 in Figs. 2 and 3. Apparatus for welding the folded edge 17 to the outer surface of the pipe is shown and described in my copending application, Serial No. 289,711, filed August 31, 1929.

In the preferred embodiment of the invention, the weld 19 is preferably formed in two operations which are preferably performed simultaneously, one of the welding operations being performed over the other, as indicated at 19a and 19b. I find this construction advantageous as all holes or other imperfections in the first weld are closed or repaired in the second welding operation. The weld is preferably formed by employing welding apparatus of the metallic electrode type so that the metal of the electrodes is added to the metal of the pipe. This prevents corrosion at the interlocking seam and is an important feature of my invention as corrosion at the seam would result in leaks therethrough so that it would not be fluid-tight. As indicated above, a primary object of the welding operations is to provide a seal at the interlocking seam so that it will be fluid-tight. This distinguishes from spiral pipe wherein the convolutions are secured to each other solely, or mainly by a welded seam. Pipe having an interlocking seam which is not welded and which secures the convolutions to each other, is a commercial product for some purposes.

The double weld 19 formed by my improved method is also advantageous as compared with a single weld. The interlocking seam is relatively cold when the first welding operation is performed and the resulting weld is brittle. The second welding operation is preferably performed when the folded edge 17 is still hot as a result of the first welding operation and, therefore, serves to anneal the metal of the first weld and also the metal adjacent it. It is in effect a heat treatment for the folded edge 17 so that the metal thereof is relieved of strains and stresses and has its tensile strength increased. This has been verified by suitable tests, such tests being made to determine the bursting pressure for the pipe. Interlocking seams which had not been subjected to the double welding operation failed at the folded edge 17 when substantially lower pressures obtained in the pipe than obtained therein when a similar seam having a double weld failed at the folded edge.

A feature of the improved pipe is that the flaring flange portion 16 yields when the pipe is subjected to forces which tend to change its length or bend it. With this construction, the pipe may be bent cold. It is common practice to dig a curved ditch and then bend the pipe to correspond to the curve of the ditch. This bending is done while the pipe is cold. It is also common practice to bend steel pipe having longitudinal seams, but such pipe is first heated.

The outwardly flaring flange 16 of the improved pipe functions as an expansion joint extending continuously along the length of the pipe. Numerous lengths of the improved pipe may be welded to each other and the flanges 16 will yield to absorb changes in the length of the pipe due to temperature changes.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. A method of forming a pipe from a ribbon of metal, which method comprises winding the ribbon of metal to provide a series of spiral convolutions, simultaneously forming a lock-seam between adjacent convolutions in such manner that a folded edge of the lock-seam extends spirally around the outer surface of the pipe, welding said folded edge to the outer surface of the pipe and adding metal from an electrode to said weld, and superimposing a second weld of added metal upon the first weld while the first weld is still hot as a result of the first welding operation.

2. A pipe comprising a ribbon of metal providing a plurality of spiral convolutions joined to each other by a spiral lock seam extending substantially the entire length of the pipe and including a spiral outwardly flaring portion of the wall of said pipe, the portion of the lock seam spaced from said outwardly flaring portion being welded to the pipe to form a fluid tight joint along said lock seam, said lock seam preventing failure of said weld by forces acting longitudinally of said pipe and, also, forces bending said pipe.

3. A pipe comprising a ribbon of metal providing a plurality of spiral convolutions secured to each other by a lock seam extending substantially the entire length of the pipe, said lock seam being welded to the outer surface of said pipe, and the wall of said pipe having an outwardly flaring portion extending spirally of the pipe substantially the entire length thereof.

4. A pipe comprising a ribbon of metal providing a plurality of convolutions secured to each other by a spiral lock seam extending substantially the entire length of the pipe, said lock seam being four layers of the wall of said pipe in thickness and being joined along one of its edges to the pipe by an outwardly flaring portion of said wall, the other edge of said lock seam being welded to the outer surface of said wall.

5. A pipe comprising a ribbon of metal providing a plurality of spiral convolutions joined to each other by an integral spiral lock seam extending substantially the entire length of said pipe, said lock seam being welded to said pipe to provide a fluid tight joint, the wall of said pipe having a spiral flange extending substantially the entire length of said lock seam, said flange projecting from said wall at an angle thereto to yield when said pipe is subjected to forces tending to elongate the pipe and, also, forces bending said pipe.

In testimony whereof, I hereunto affix my signature, this 5th day of February, 1930.

CARL G. NAYLOR.